United States Patent
Ohishi

(10) Patent No.: US 9,460,512 B2
(45) Date of Patent: Oct. 4, 2016

(54) THREE-DIMENSIONAL IMAGE PROCESSING APPARATUS AND RECONSTRUCTION REGION SPECIFICATION METHOD

(75) Inventor: Satoru Ohishi, Otawara (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 1691 days.

(21) Appl. No.: 11/746,831

(22) Filed: May 10, 2007

(65) Prior Publication Data

US 2008/0009716 A1  Jan. 10, 2008

(30) Foreign Application Priority Data

May 12, 2006  (JP) ................................ 2006-133971

(51) Int. Cl.
   G06K 9/00   (2006.01)
   G06T 7/00   (2006.01)

(52) U.S. Cl.
   CPC ... G06T 7/0042 (2013.01); *G06T 2207/30101* (2013.01)

(58) Field of Classification Search
   None
   See application file for complete search history.

(56) References Cited

U.S. PATENT DOCUMENTS

| | | | |
|---|---|---|---|
| 5,687,737 A * | 11/1997 | Branham et al. | 600/523 |
| 2004/0252205 A1 * | 12/2004 | Onoda | 348/231.3 |
| 2005/0220264 A1 * | 10/2005 | Homegger | 378/8 |
| 2006/0082598 A1 * | 4/2006 | Ohishi et al. | 345/653 |

FOREIGN PATENT DOCUMENTS

| | | |
|---|---|---|
| JP | 2000-217035 | 8/2000 |
| JP | 2002-143150 | 5/2002 |
| JP | 2002-291726 | 10/2002 |
| JP | 2002-336222 | 11/2002 |
| JP | 2002336222 A * | 11/2002 |
| JP | 2004-517670 | 6/2004 |
| JP | 2006-87826 | 4/2006 |
| WO | WO 2004/114221 A1 | 12/2004 |
| WO | WO 2006/028085 A1 | 3/2006 |

OTHER PUBLICATIONS

Office Action issued Mar. 9, 2011 in Japanese Patent Application No. 200710102922.3 (with English translation).
Japanese Office Action issued Jan. 24, 2012 in patent application No. 2007-128524 with English translation.

* cited by examiner

*Primary Examiner* — Kim Vu
*Assistant Examiner* — Fred Hu
(74) *Attorney, Agent, or Firm* — Oblon, McClelland, Maier & Neustadt, L.L.P

(57) ABSTRACT

A three-dimensional image processing apparatus which obtains a three-dimensional image from a plurality of images from different projection views of a patient which have been obtained by carrying out multiple imaging while rotating around the patient, includes a locating unit to specify a point of one of the plurality of images from different projection views. A searching unit searches a point corresponding to the specified point in the plurality of images from different projection views, on the basis of the specified point. A reconstruction region identification unit identifies a region of a part of a region which can be reconstructed, as a reconstruction region by using the specified point and the searched point. A reconstruction unit obtains a three-dimensional image by reconstructing an image in the identified reconstruction region.

15 Claims, 12 Drawing Sheets

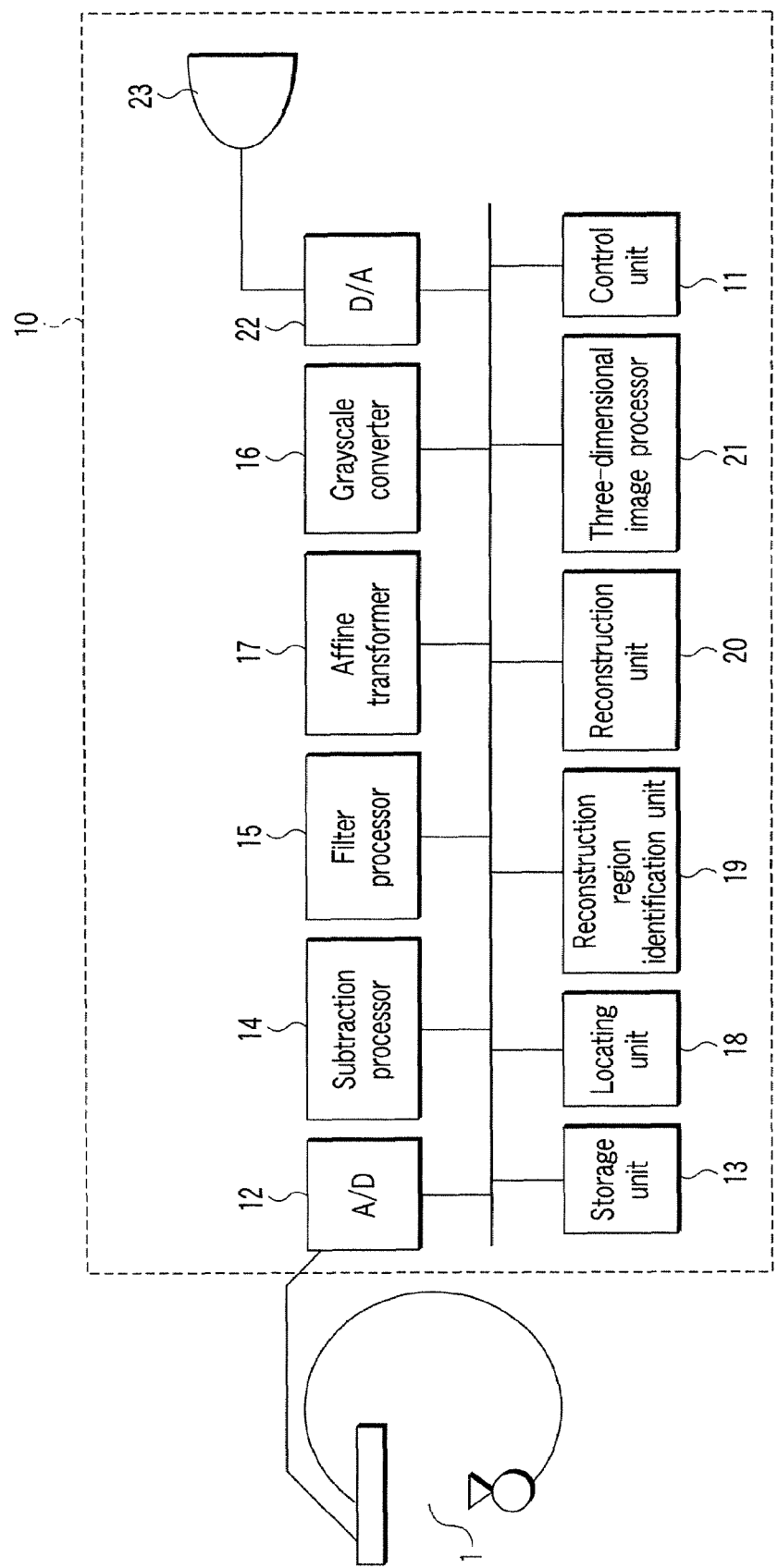
F I G. 1

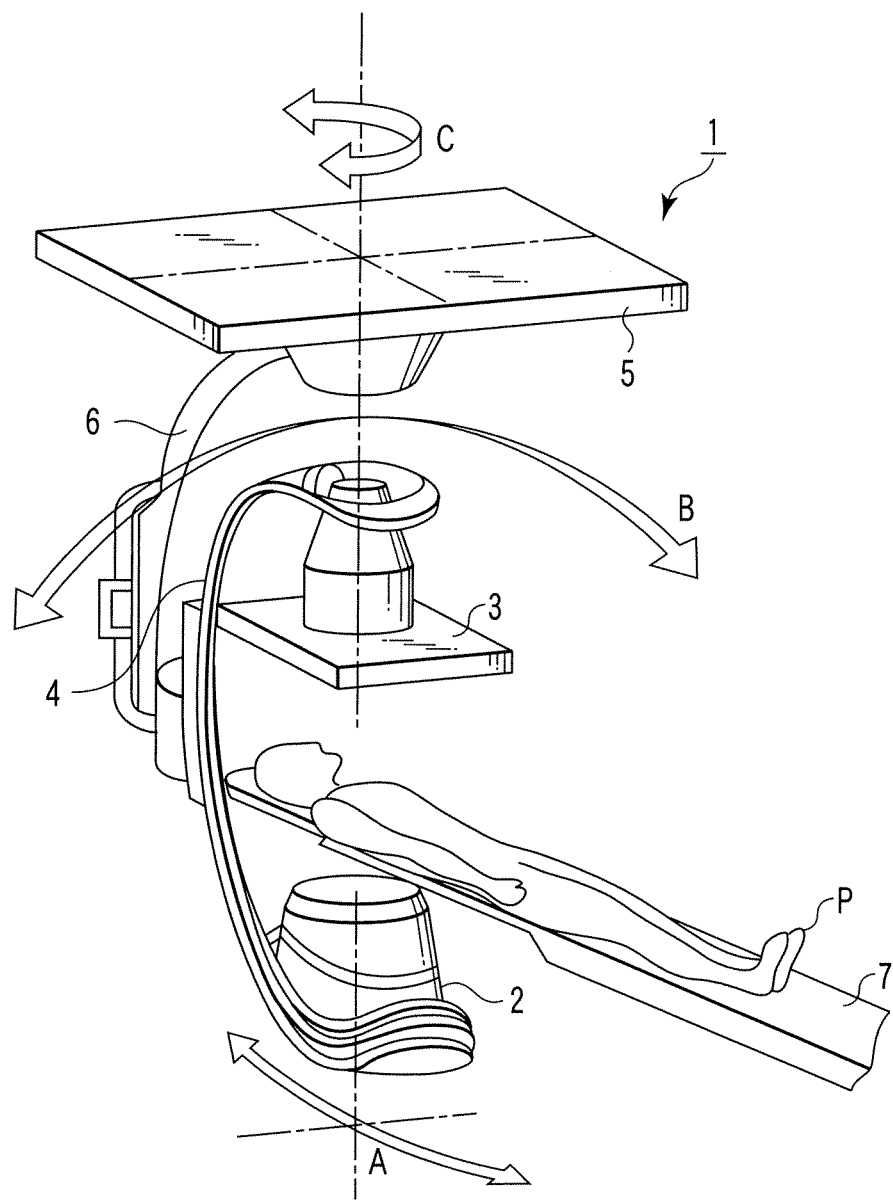
F I G. 2

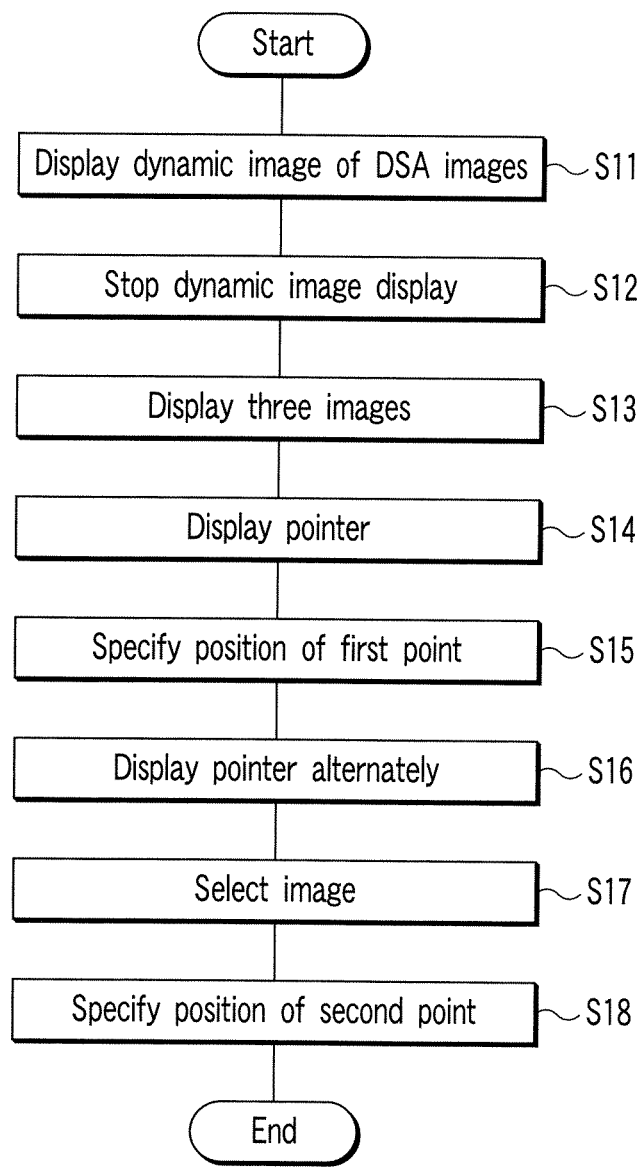
F I G. 4

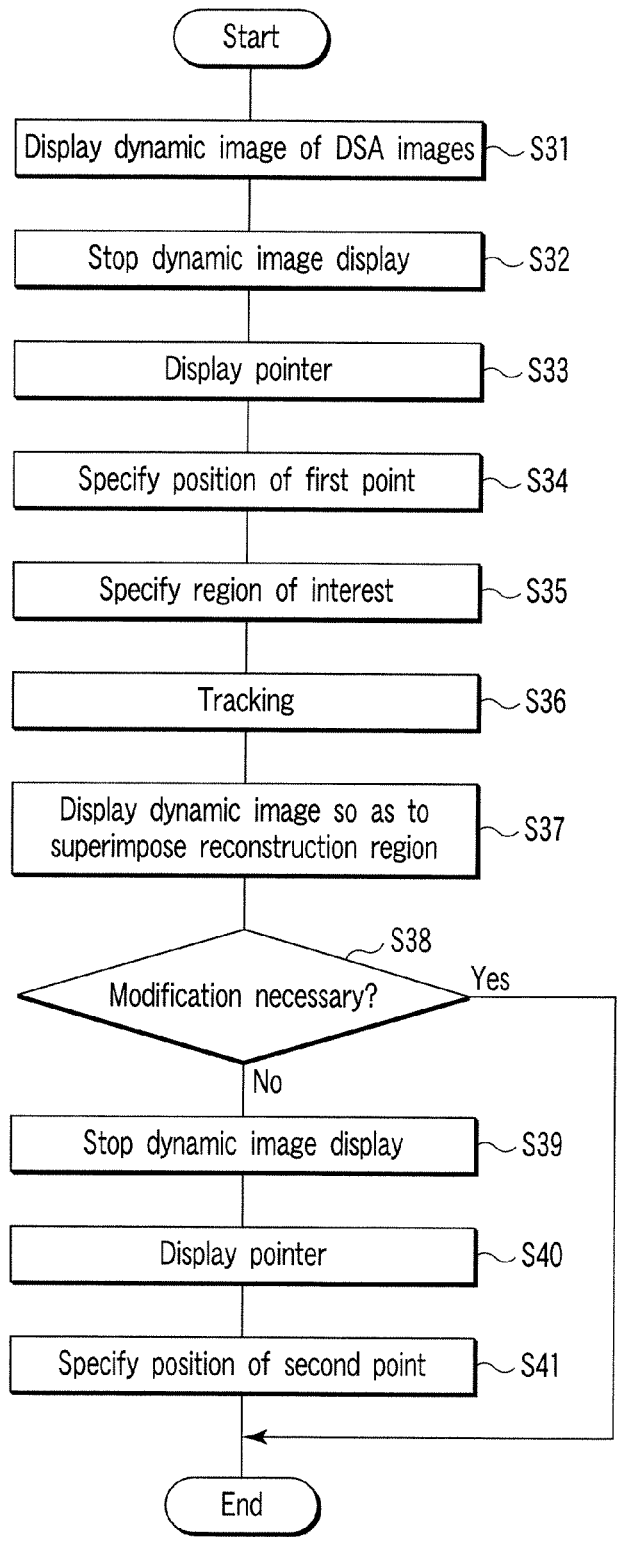
F I G. 7

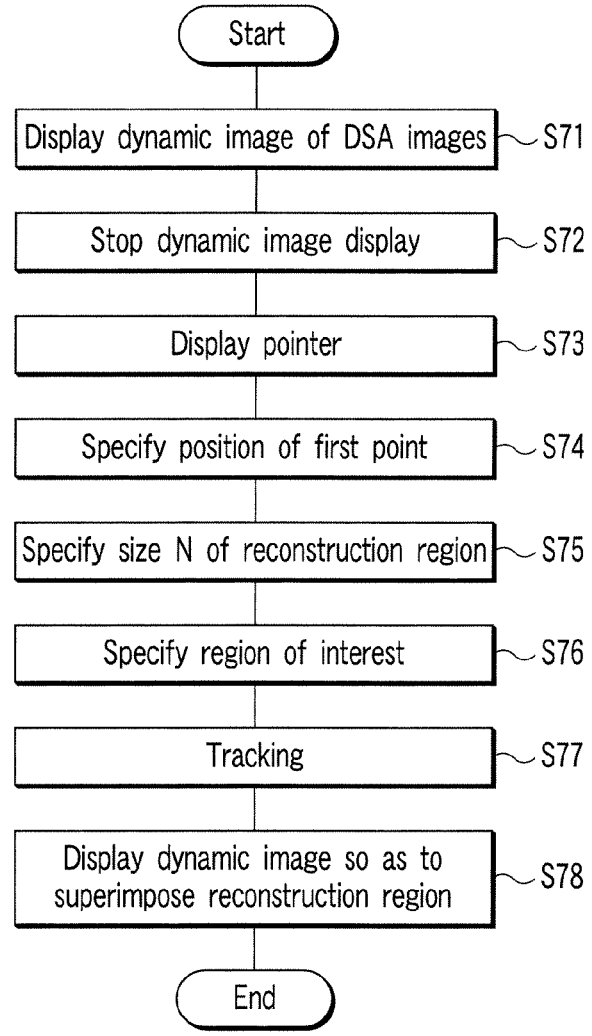
F I G. 14
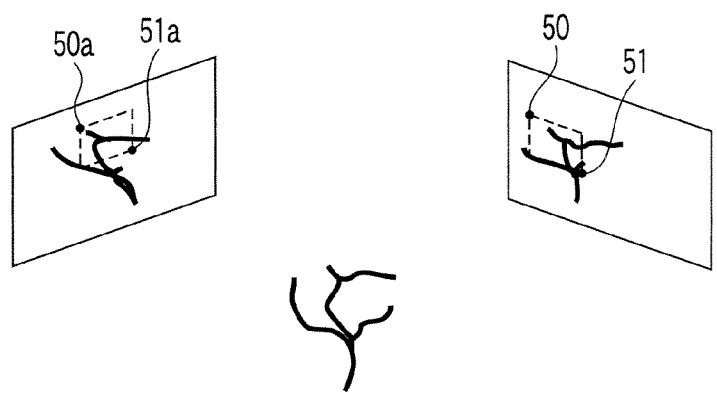
F I G. 15

THREE-DIMENSIONAL IMAGE PROCESSING APPARATUS AND RECONSTRUCTION REGION SPECIFICATION METHOD

CROSS-REFERENCE TO RELATED APPLICATIONS

This application is based upon and claims the benefit of priority from prior Japanese Patent Application No. 2006-133971, filed May 12, 2006, the entire contents of which are incorporated herein by reference.

BACKGROUND OF THE INVENTION

1. Field of the Invention

The present invention relates to a three-dimensional image processing apparatus capable of obtaining a three-dimensional image from a plurality of images obtained by imaging around a patient, and a reconstruction region specification method in such a three-dimensional image processing apparatus.

2. Description of the Related Art

Three-dimensional (3D) angiography is a technology of generating a fine three-dimensional image of blood vessels such that a plurality of images from different projection views are respectively collected before and after an injection of a contrast medium by repeating imaging while rotating an X-ray tube or the like around a patient, and angiographic blood vessel parts are mainly extracted by subtraction of the collected images before and after an injection of a contrast medium, and the images on which the vessel portions have been extracted are further reconstructed. By an image generated by 3D angiography, it is said to be possible to observe a vessel from an arbitrary angle, and it is particularly useful for carrying out a diagnosis and a medical treatment in a cranial nerve field, in particular, of an aneurysm. An image of an aneurysm generated by 3D angiography has the following clinical usability.

1. It is possible to identify an angle from which it is easy to view an aneurysm.

In order to carry out a diagnosis and a medical treatment of an aneurysm, information from an angle from which it is easy to view a neck of the aneurysm is extremely important. However, because an X-ray image has only two-dimensional information, it is not easy to identify an image from an angle from which it is easy to view a neck of the aneurysm. Until the development of a 3D angiography device, all identification operations have been carried out by trial and error. To describe concretely, it is the procedure in which an observation angle is switched (randomly) to an angle thought fit to observe, and when a neck of an aneurysm cannot be seen, an observation thereof is made from another angle. Identification of an observation angle by such a procedure increases not only an inspection time, but also an exposure dose and an amount of a contrast medium onto a patient, and the like, which increases a burden onto the patient. In contrast thereto, by 3D angiography, it is possible to obtain fine images from all angles around the patient, and thus it is possible to carry out identification of an observation angle of an aneurysm image in a short time as compared with that in the conventional art.

2. It is possible to obtain an image on which it is possible to easily grasp a relationship between a neck and a dome of an aneurysm.

A relationship between a neck and a dome of an aneurysm is extremely important for deciding on courses of treatment. For example, in a case of carrying out a treatment for an aneurysm by coil embolization, when a neck is significantly smaller than a dome, a coil is stabilized in the aneurysm. However, if this is not the case, even when the coil is kept in the aneurysm, the coil deviates into a main blood vessel, which brings about the risk that a peripheral blood vessel is embolized unfortunately. Accordingly, in the latter case, it has been thought that a risk that coil embolization is used for a treatment for an aneurysm is high, and there are many cases in which a surgical treatment (a clipping surgery) is applied thereto. It is easy to make such a judgment in an aneurysm image generated by 3D angiography.

3. It is possible to obtain an image on which it is possible to identify branch connections of capillary blood vessels diverging from the vicinity of an aneurysm.

With respect to a capillary blood vessel diverging from the vicinity of an aneurysm, it is difficult to confirm where the blood vessel diverges from. If the capillary blood vessel diverges from a dome of the aneurysm, the blood vessel itself is embolized by using coil embolization. If the blood vessel serves an important role in brain function, critical damage will be caused. Accordingly, when a capillary blood vessel diverges from a dome of an aneurysm, it is important to know whether the blood vessel diverges from the aneurysm, or diverges from the other blood vessel. Generally, when the blood vessel diverges from the aneurysm, it has been thought that the risk of coil embolization is high, and there are many cases in which a surgical treatment (a clipping surgery) is applied thereto.

Further, on an aneurysm image generated by 3D angiography, it is possible to confirm not only the various information described above, but also an anatomical position. For example, when there is an aneurysm in the vicinity of the base of the brain, it is possible to judge that a surgical approach is difficult.

In order to make a judgment as described above (in particular, the judgment of 2 or 3), precise information is required. A good deal of time is necessary for reconstructing the precise information. However, considering the fact that such information is required in process of intervention in which a diagnosis and a treatment are carried out at substantially the same time, the information is preferably provided in a short time. Generally, an image display within one minute is desired. However, it is difficult to display precise information within one minute even by using a most advanced high-speed arithmetic chip.

Here, as one of the methods for shortening a reconstruction time, there is a technique of limiting a region on which reconstruction is carried out (called ROI). It is assumed that a filtered backprojection method which is general as a reconstruction technique is used. Because a backprojection operation is dominant in a reconstruction time, provided that a voxel size can be limited to be half per one side, one eighth of a usual a reconstruction time is enough. There is hardly any case in which information on an entire blood vessel is required clinically in practice, and for example, in a case of an aneurysm, it suffices to represent the aneurysm, a main blood vessel thereof, and peripheral blood vessels thereof. Thus, the limitation of a reconstruction region is a limitation which is easy to be accepted clinically as well.

As one of the methods for limiting the reconstruction region described above, there is a method in which images of a front face and side faces (separated by 90°) are displayed to be next to one another, and a circular or rectangular reconstruction region is specified by specifying a center and a size in each of the images. However, in such a method, it is necessary to input at least four data (two dataxtwo images) in order to carry out reconstruction. Further, respective target structures of the front face and the side faces are preferably clearly observed. However, there are cases in which it is difficult to judge where a target structure is due to one of those being superimposed on another vessel. In such a case, an image which is in a direction relatively close to the image on which it is difficult to judge a target structure, and which can be clearly judged is selected, and a center and a size are specified in the newly selected image. In this case, further extra operations are required.

However, as described above, 3D angiography is a function required particularly in process of intervention, and an operation requiring many processes as described above is unacceptable.

BRIEF SUMMARY OF THE INVENTION

An object of the present invention is to provide a three-dimensional image processing apparatus capable of limiting and specifying a reconstruction region in a short time by a simple operation, and a reconstruction region specification method.

According to a first aspect of the present invention, there is provided a three-dimensional image processing apparatus which obtains a three-dimensional image from a plurality of images from different projection views of a patient which have been obtained by carrying out multiple imaging while rotating around the patient, the apparatus comprising: a locating unit to specify a point of one of said plurality of images from different projection views; a searching unit which searches a point corresponding to the specified point in said plurality of images from different projection views, on the basis of the specified point; a reconstruction region identification unit which identifies a region of a part of a region which is capable of reconstructing as a reconstruction region by using the specified point and the searched point; and a reconstruction unit which obtains a three-dimensional image by reconstructing an image in the identified reconstruction region.

According to a second aspect of the present invention, there is provided a reconstruction region specification method for reconstructing a three-dimensional image from a plurality of images from different projection views of a patient which have been obtained by carrying out multiple imaging while rotating around the patient, the method comprising: specifying a point of one of said plurality of images from different projection views; searching a point corresponding to the specified point in said plurality of images from different projection views; and identifying an region of a part of a region which can be reconstructed in said plurality of images from different projection views, as a reconstruction region on the basis of the specified point and the searched point.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a structure of an X-ray diagnostic apparatus as one example of a three-dimensional image processing apparatus according to a first embodiment of the present invention;

FIG. 2 is a diagram showing a structure of an X-ray imaging unit;

FIG. 4 is a flowchart showing details of locating process in the first embodiment;

FIG. 7 is a flowchart showing details of locating process in a third embodiment;

FIG. 14 is a flowchart showing details of locating process in a sixth embodiment; and FIG. 15 is a diagram showing a modified example of the locating process in the sixth embodiment.

DETAILED DESCRIPTION OF THE INVENTION

Figure 3:
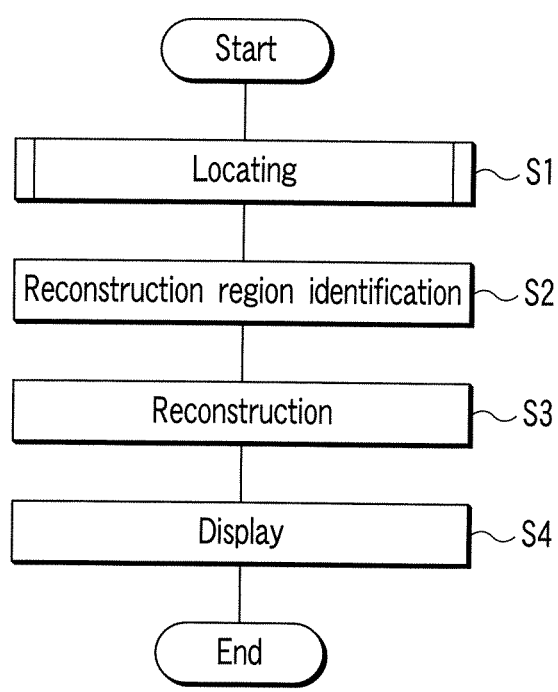
FIG. 3 is a flowchart showing a schematic processing flow from when DSA images are generated until a three-dimensional image is displayed.

Hereinafter, embodiments of the present invention will be described with reference to the drawings.

First Embodiment

FIG. 1 is a block diagram showing a structure of an X-ray diagnostic apparatus as one example of a three-dimensional image processing apparatus according to a first embodiment of the present invention. The X-ray diagnostic apparatus shown in FIG. 1 is structured mainly from an X-ray imaging unit 1 and an X-ray diagnostic apparatus main body 10. Then, the X-ray diagnostic apparatus has a function of displaying a three-dimensional image by reconstructing a plurality of images from different projection views before and after an injection of a contrast medium, which are obtained by the X-ray imaging unit 1, by the X-ray diagnostic apparatus main body 10.

The X-ray imaging unit 1 has an X-ray tube 2 and an X-ray detector 3 as shown in FIG. 2. The X-ray tube 2 irradiates X-rays onto a patient P. The X-ray detector 3 is structured from a flat panel detector (FPD) formed from, for example, semiconductor detecting elements arrayed in a matrix form, and detects the X-rays which have been irradiated from the X-ray tube 2, and have transmitted through the patient P. Note that the X-ray detector 3 is not limited to an FPD, and may be a detector structured from, for example, an image intensifier and a TV camera.

The X-ray tube 2 and the X-ray detector 3 shown in FIG. 2 are mounted to a substantially C-shaped arm (C-shaped arm) 4. Moreover, the C-shaped arm 4 is supported by a brace 6 suspended from a foundation 5 provided to, for example, the ceiling. Then, the C-shaped arm 4 is rotatable with respect to three orthogonal axes A, B, and C shown in FIG. 2. Further, a bed 7 for laying the patient P down is disposed between the X-ray tube 2 and the X-ray detector 3.

The X-ray diagnosis main body 10 is structured from a control unit 11, an analog-to-digital converter 12, a storage unit 13, a subtraction processor 14, a filter processor 15, a grayscale converter 16, an affine transformer 17, a locating unit 18, a reconstruction region identification unit 19, a reconstruction unit 20, a three-dimensional image processor 21, a digital-to-analog converter 22, and an image display unit 23.

The control unit 11 carries out operational control of the X-ray tube 2, the X-ray detector 3, and the C-shaped arm 4, and display control of the image display unit 23, and the like. The analog-to-digital converter 12 is connected to the X-ray imaging unit 1, and converts a projected image photographed by the X-ray imaging unit 1 into digital data. The storage unit 13 stores various data such as two-dimensional image data inputted from the analog-to-digital converter 12, three-dimensional image data generated by the three-dimensional image processor 21, and the like. The subtraction processor 14 generates digital subtraction angiography (DSA) images by carrying out subtraction of images before and after an injection of an contrast medium in the same angle (from the same projection view) stored in the storage unit 13 via the analog-to-digital converter 12. The filter processor 15 carries out high-frequency enhancement (edge enhancement) process onto the DSA images generated by the subtraction processor 14. The grayscale converter 16 is a look-up table (LUT) for carrying out grayscale conversion such that grayscale of an image or the like processed by the filter processor 15 is converted so as to be suitable for a display on the image display unit 23. The affine transformer 17 carries out transformation process for enlarging or moving a two-dimensional image or a three-dimensional image displayed on the image display unit 23.

The locating unit 18 is an operating member structured from a pointing device such as, for example, a mouse. Hereinafter, the description will be continued supposing that the locating unit 18 is a mouse. The reconstruction region identification unit 19 identifies a reconstruction region by receiving an operation by the locating unit 18 (the details thereof will be described later). The reconstruction unit 20 reconstructs a three-dimensional image on the basis of a result identified from a plurality of projected images from different projection views photographed by the X-ray imaging unit 1, by the reconstruction region identification unit 19. The three-dimensional image processor 21 generates data for displaying the three-dimensional image obtained by the reconstruction by the reconstruction unit 20. The digital-to-analog converter 22 converts the data of the DSA images generated by the subtraction processor 14 and the data of the three-dimensional image generated by the three-dimensional image processor 21 into analog signals (video signals). The image display unit 23 displays images on the basis of the video signals outputted from the digital-to-analog converter 22.

Next, operations of the X-ray diagnostic apparatus according to the present embodiment will be described. The C-shaped arm 4 is structured so as to be rotatable as a propeller at high speed by, for example, a motor, which makes it possible to rotate an angle of 180° or more (180°+a fan angle) around a patient in a short time. In this way, X-ray imaging is repeated, for example, at intervals of 1° while rotating the C-shaped arm 4. The X-ray imaging is carried out from projection angles, for example, from 0° up to 200°, and as a result, 200 projected images of rotation angles of 200° are collected. The collected 200 projected images are converted into digital signals (two-dimensional image data) of, for example, 512×512 in the analog-to-digital converter 12, and are stored in the storage unit 13. The collection of two-dimensional image data is carried out twice before and after an injection of a contrast medium. First, 200 projected images are collected before the injection of a contrast medium, and are stored in the storage unit 13. Thereafter, a projection view is returned to 0°, and when a delay time suitable for an imaging region passes after a contrast medium has been injected into the patient, imaging is repeated under the same condition, and 200 projected images after the injection of a contrast medium are collected, and are stored in the storage unit 13.

At a point in time when the 200 image data before the injection of a contrast medium and the 200 image data after the injection of a contrast medium are stored in the storage unit 13, the both image data are transferred to the subtraction processor 14. In the subtraction processor 14, with respect to the image data before the injection of a contrast medium and the image data after the injection of a contrast medium, subtraction of image data from a projection view corresponding to one another (in the same angle) is carried out. In accordance therewith, DSA images on which a blood vessel part photographed in contrast by the contrast medium is mainly extracted are generated. In the present embodiment, a reconstruction region at the time of reconstruction is specified on the basis of the DSA images obtained by the subtraction processor 14.

Hereinafter, a method for specifying a reconstruction region according to the present embodiment will be described. FIG. 3 is a flowchart showing a schematic process flow from when DSA images are generated until a three-dimensional image is displayed. Further, FIG. 4 is a flowchart showing details of locating process in step S1 in FIG. 3. Note that the processes in these flowcharts are controlled by the control unit 11.

After the DSA images from respective projection views have been obtained by the subtraction processor 14, the control unit 11 executes locating process (step S1). This locating process will be described with reference to FIG. 4. First, the control unit 11 sequentially displays the DSA images from respective projection views one by one on the image display unit 23 immediately after the DSA images from respective projection views have been obtained by the subtraction processor 14 (step S11). In accordance therewith, the DSA images from different projection views photographed by the rotation of the C-shaped arm 4 are displayed as a dynamic image on the image display unit 23.

Figure 5A:
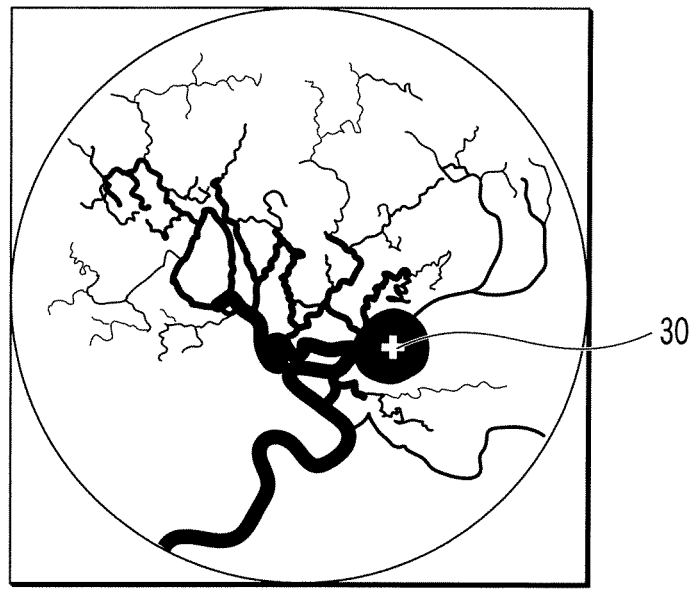
FIGS. 5A and 5B are diagrams showing display examples of pointers.

An operator of the X-ray diagnostic apparatus observes the dynamic image displayed on the image display unit 23, and when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S12). Thereafter, three images of a DSA image displayed on the image display unit 23 at the point in time when the operator has pressed the determination button, and DSA images at 30° before and after the DSA image are displayed as still images on the image display unit 23 (step S13). After these three images are displayed, a pointer 30 as shown, for example, in FIG. 5A is displayed on the central position of a DSA image (i.e., the DSA image displayed at the time of stopping the dynamic image) selected by the operator among the three images displayed on the image display unit 23 (step S14).

When a mouse operation is carried out in this state by the operator, the pointer 30 moves in accordance with the operation. The operator presses the determination button at a point in time when the pointer 30 has been moved to a position of the target structure (step S15). In accordance therewith, a position of a first point necessary for identification of a reconstruction region, which will be described later, is specified.

Figure 5B:
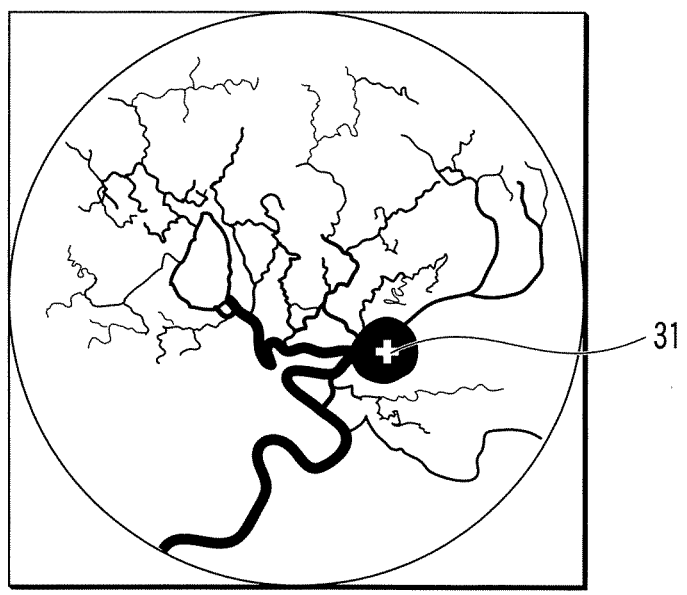

After step S15, the control unit 11 displays a pointer 31, for example, as that in FIG. 5B alternately on the central positions of the other two DSA images which have not been selected by the operator (step S16). This alternate display of the pointer 31 is switched, for example, every three seconds.

When the operator carries out a mouse operation (for example, an operation for moving the mouse, an operation of the determination button, or the like) when the pointer 31 is displayed on a DSA image on which it is easy to view a target structure, the alternate display of the pointer 31 is terminated at that point in time, and it is possible to move the pointer 31 in the selected DSA image at that time (step S17). The operator presses the determination button at a point in time when the pointer 31 has been moved to a position of the target structure (step S18). In this manner, a position of a second point necessary for identification of a reconstruction region, which will be described later, is specified, and the locating process of FIG. 4 is completed.

After the locating process in step S1, information on the two images and positional information on the two points selected by the operator are transmitted to the reconstruction region identification unit 19. In accordance therewith, the reconstruction region identification unit 19 identifies a reconstruction region (step S2). At the time of the identification of a reconstruction region, a three-dimensional position of the target structure is calculated on the basis of the positional information on the target structure in the two DSA images obtained as a result of the locating process in step S1. To describe concretely, an equation of a straight line connecting the position initially specified with a position of the X-ray tube 2 at that time is calculated, and an equation of a straight line connecting the position secondly specified with a position of the X-ray tube 2 at that time is calculated. Then, two points respectively coming closest to one another on the two equations of straight lines are derived, and an intersection of the two points is identified as a central position of the reconstruction region.

After the identification of the reconstruction region in step S2, the obtained information on the central position is transmitted to the reconstruction unit 20. In accordance therewith, the reconstruction unit 20 reconstructs a three-dimensional image on the basis of the 200 DSA images from different projection views (step S3). Here, as one example of reconstruction methods, a case of a filtered backprojection method proposed by Feldkamp et al. is shown. In this technique, first, an appropriate convolution filter such as, for example, a Shepp & Logan filter or a Ramachandran filter is applied onto the 200 DSA images from different projection views. Next, reconstruction data centering on the central position of the reconstruction region are obtained by carrying out a backprojection operation. Generally, a reconstruction region is defined as a cylinder touching internally X-ray flux toward all directions from the X-ray tube 2. Then, a three-dimensional image is defined as a cube touching externally the cylinder. For example, this cube is discretized in three dimensions with a length d. The length d is obtained by correcting a width between adjacent detecting elements structuring the X-ray detector 3 in consideration of a scale of enlargement of an X-ray projection system. When a projected image is 512×512, a voxel matrix size of a three-dimensional image is to be 512×512×512 in the conventional art. In contrast, in the present embodiment, reconstruction is carried out only in a limited reconstruction region centering on the central position identified by the reconstruction region identification unit 19. This region is, for example, a region centering on the central position, and is less than or equal to ⅛ of a three-dimensional image in the conventional art. For example, supposing that a voxel matrix size of a region which can be reconstructed is $512^3$, a region of $256^3$ centering on the central position identified by the reconstruction region identification unit 19 is the final reconstruction region. When a voxel matrix size of a region which can be reconstructed is $1024^3$, a region of $512^3$ centering on the central position of the reconstruction region is the final reconstruction region. By limiting a reconstruction region in this way, it is possible to shorten a reconstruction time to about ⅛ of a normal reconstruction time.

The three-dimensional image reconstructed by the reconstruction unit 20 is transmitted to the three-dimensional image processor 21. The three-dimensional image processor 21 generates display data for three-dimensional display by a method such as volume rendering. The display data is transmitted to the image display unit 23 via the digital-to-analog converter 22. Then, a three-dimensional blood vessel image is displayed on the image display unit 23 (step S4).

As described above, in accordance with the first embodiment, it is possible for the operator to limit and specify a reconstruction region by merely specifying one point in each of two images on which it is easy to observe a target structure. In accordance therewith, it is possible to specify a reconstruction region by a simple operation, which makes it possible to shorten a reconstruction time.

Further, by displaying DSA images from different projection views sequentially on the image display unit 23 as a dynamic image, it is easy to find an image on which it is easy to observe a target structure. Further, it is possible for the operator to carry out all the operations shown in FIG. 4 by merely operating the single locating unit (mouse) 18, and it is easy to input data for specifying a reconstruction region.

Note that, in the example shown in FIG. 4, after the display of the dynamic image has been stopped, the DSA image displayed on the image display unit 23 at that time and the DSA images at 30° before and after the DSA image are displayed. However, this angle is merely one example. However, in a case of images at 30° before and after the DSA image, because the projection views of the two images are different to some extent, and there is hardly any case in which a target structure is superimposed on another blood vessel to be lost from sight, it is expected that the precision of identification is improved.

Further, the three images are to be displayed simultaneously in step S13 of FIG. 4. However, this may be structured such that, after the display of the dynamic image is stopped, first, a DSA image displayed on the image display unit 23 at that time is displayed as a still image, and after a first point is specified in this image, DSA images at 30° before and after the DSA image are displayed.

Second Embodiment

Next, a second embodiment of the present invention will be described. The second embodiment is a first modified example of the locating process in step S1 and the reconstruction region identification processing in step S2 in FIG. 3. Note that, because the structure of the apparatus and the processes on and after step S3 in FIG. 3 are the same as those in the first embodiment, descriptions thereof will be omitted.

Figure 6:
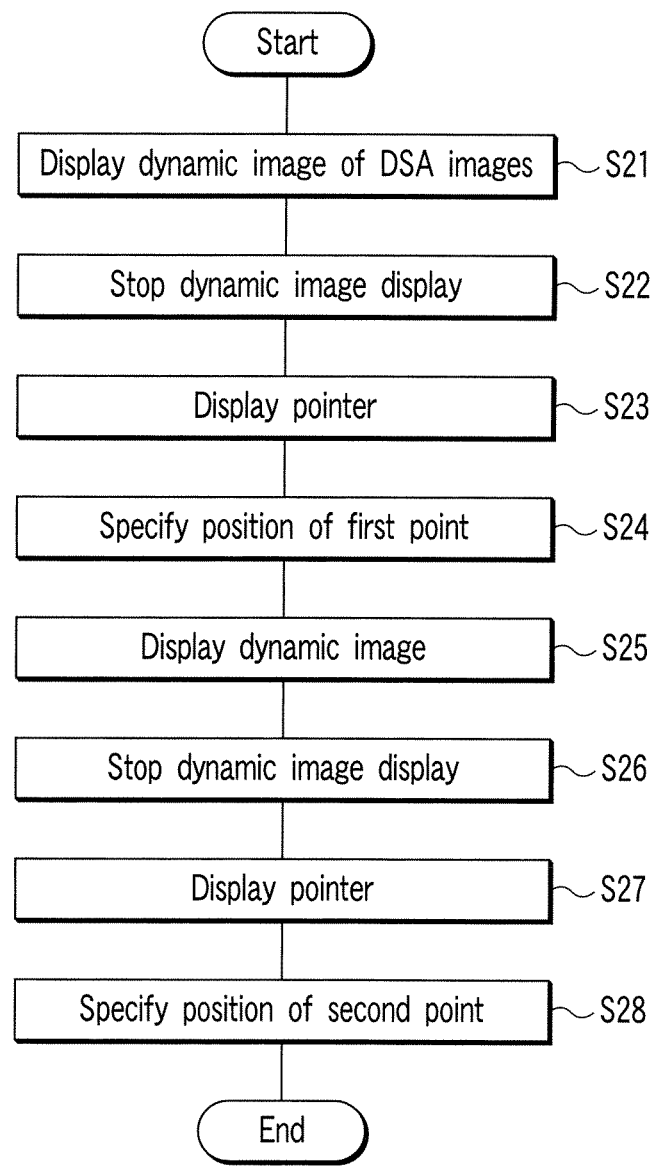
FIG. 6 is a flowchart showing details of locating process in a second embodiment.

FIG. 6 is a flowchart showing details of locating process in the second embodiment. First, the control unit 11 sequentially displays the DSA images from respective projection views one by one on the image display unit 23 immediately after the DSA images from respective projection views have been obtained by the subtraction processor 14 (step S21). An operator observes the dynamic image displayed on the image display unit 23, and at a point in time when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S22). Here, in the first embodiment described above, when the display of the dynamic image is stopped, three images of a DSA image displayed at that point in time and DSA images at 30° before and after the DSA image are displayed. However, in the second embodiment, at a point in time when the display of the dynamic image is stopped, only a DSA image displayed at that time is displayed as a still image, and the pointer 30 as shown, for example, in FIG. 5A is displayed at the central position of the DSA image (step S23).

When a mouse operation is carried out in this state by the operator, the pointer 30 moves in accordance with the operation. The operator presses the determination button at a point in time when the pointer 30 has been moved to a position of a target structure (step S24). In this manner, a position of a first point necessary for identification of a reconstruction region is specified.

After the position of the first point is specified, the control unit 11 restarts a display of the dynamic image which has been stopped in step S22 (step S25). The operator presses the determination button at a point in time when a DSA image from an angle from which it is easy to observe a target structure such as an aneurysm and a stenosis, and which is different from the initial angle is displayed. In accordance therewith, the control unit 11 stops the display of the dynamic image (step S26). Thereafter, in the same way as that in step S24, the control unit 11 displays the pointer 31 at the center of the DSA image displayed on the image display unit 23 (step S27). The operator presses the determination button at a point in time when the pointer 31 has been moved to a position of a target structure (step S28). In accordance therewith, a position of a second point necessary for identification of a reconstruction region is specified.

In accordance with the locating process of the second embodiment as described above as well, the same effect as in the first embodiment can be obtained.

Third Embodiment

Next, a third embodiment of the present invention will be described. The third embodiment is a second modified example of the locating process in step S1 and the reconstruction region identification process in step S2 in FIG. 3. Note that, because the structure of the apparatus and the processes on and after step S3 in FIG. 3 are the same as those in the first embodiment, descriptions thereof will be omitted.

FIG. 7 is a flowchart showing details of locating process in the third embodiment. First, the control unit 11 sequentially displays the DSA images from respective projection views one by one on the image display unit 23 immediately after the DSA images from respective projection views have been obtained by the subtraction processor 14 (step S31). An operator observes the dynamic image displayed on the image display unit 23, and at a point in time when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S32). Then, the pointer 30 as shown, for example, in FIG. 5A is displayed at the central position of a DSA image displayed at that point in time (step S33). When a mouse operation is carried out in this state by the operator, the pointer 30 moves in accordance with the operation. The operator presses the determination button at a point in time when the pointer 30 has been moved to a position of the target structure (step S34). In accordance therewith, a position of a first point necessary for identification of a reconstruction region is specified. The processes so far are the same as those in the second embodiment.

Next, the control unit 11 sets a region having a size of Dcm×Dcm, centering on a point $(x_0, y_0)$ in the image specified by the operator as a region of interest in order to search a second point on the basis of the information on the first point specified by the operator (step S35). Then, the control unit 11 carries out tracking shown in FIG. 8 (step S36).

Figure 8:
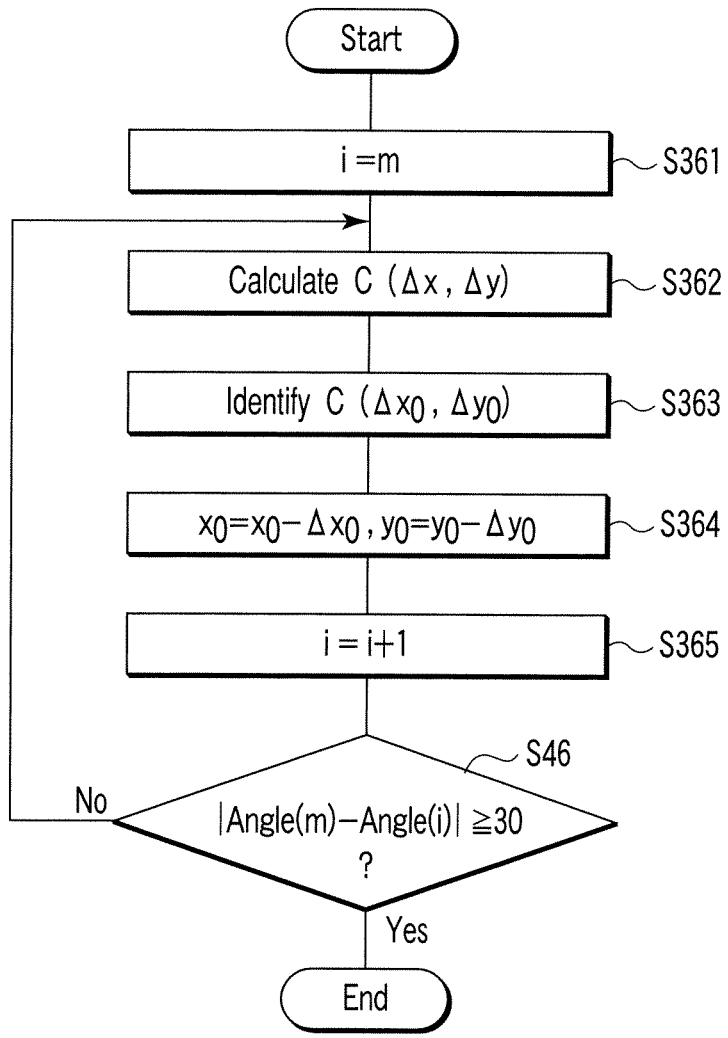
FIG. 8 is a flowchart showing a flow of tracking process.

Here, before the description of the tracking in FIG. 8, it is assumed that the DSA image stopped in step S32 is an m-th image, and the position of the first point specified in step S34 is $(x_0, y_0)$. In the tracking in step S36, first, the control unit 11 sets a variable i to m (step S361). Next, the control unit 11 carries out a calculation of the following formula (1) (step S362).

$$C(\Delta x, \Delta y) = \sum_{x=x_0-\frac{D}{2}}^{x=x_0+\frac{D}{2}} \sum_{y=y_0-\frac{D}{2}}^{y=y_0+\frac{D}{2}} \{f_i(x, y) - f_{i+1}(x - \Delta x, y - \Delta y)\}^2 \quad (1)$$

Here, $f_i(x, y)$ in the formula (1) denotes an i-th image, and $f_{i+1}(x, y)$ denotes an (i+1)-th image. Further, $\Delta x$ and $\Delta y$ denote shift amounts. In step S42, the formula (1) is calculated while $\Delta x$ and $\Delta y$ are varied from −Lcm to Lcm, and a position of a point c $(\Delta x_0, \Delta y_0)$ within the range is identified (step S363).

Next, the control unit 11 respectively updates $x_0$ and $y_0$ to $x_0 - \Delta x_0$ and $y_0 - \Delta y_0$ (step S364), further sets i=i+1(=m+1), and newly extracts a region of interest from an (i+1)-th image (step S365). Next, the control unit 11 judges whether or not the i-th image is an image separated away by 30° or more from the m-th image (step S366). At the judgment in step S366, when the i-th image is not separated away by 30° or more from the m-th image, the routine returns to step S362, and the control unit 11 carries out a calculation of the same formula (1) between the i-th image and the (i+1)-th image updated with one another.

At the judgment in step S366, when the i-th image is separated away by 30° or more from the m-th image, the positional information on the point identified in the m+30-th image and the point identified in the m-th image, and the information on the both images are transmitted to the reconstruction region identification unit 19, and the tracking is completed.

In accordance therewith, the reconstruction region identification unit 19 calculates a position of a target structure in three dimensions. To describe concretely, an equation of a straight line connecting the point in the m-th image initially specified with a position of the X-ray tube 2 at that time is calculated, and an equation of a straight line connecting the point identified in the m+30-th image with a position of the X-ray tube 2 at that time is calculated. Then, two points respectively coming closest to each other on the two straight lines are derived, and an intersection of the two points is identified as a central position of the reconstruction region.

Figure 9:
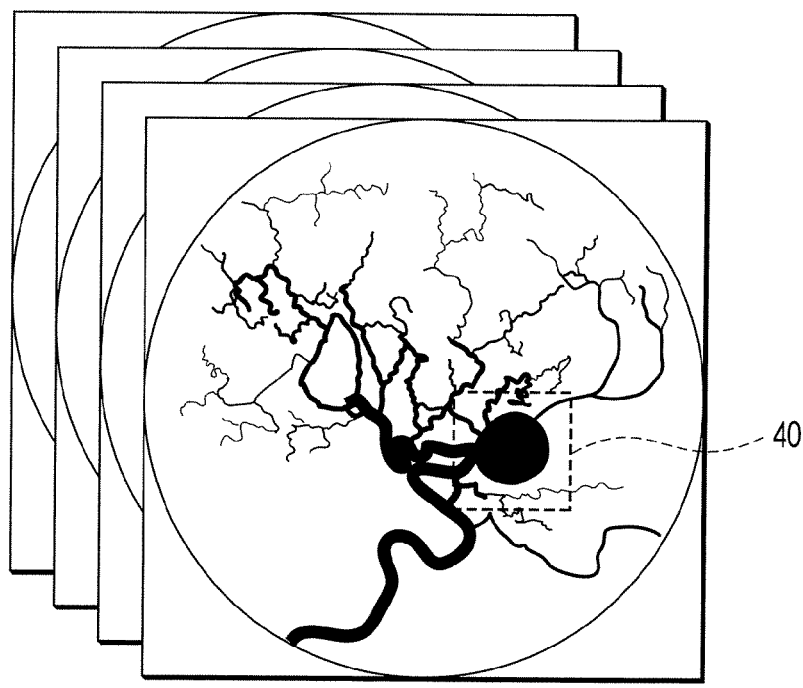
FIG. 9 is a diagram showing a display example of a reconstruction region.

After the central position of the reconstruction region has been identified, the control unit 11 restarts a display of a dynamic image, and further displays a reconstruction region 40 so as to be superimposed on the dynamic image as shown in FIG. 9 (step S37). Here, the reconstruction region is displayed by drawing a square in a size of the reconstruction region (for example, a square in a size of $256^2$ or $512^2$) centering on a projected point of the central position identified by the reconstruction region identification unit 19. Note that the projected point of the central position is calculated by transmitting the central position identified by the reconstruction region identification unit 19 to an unillustrated projection transformer to be projected at each projection angle.

The operator confirms the dynamic image and the reconstruction region displayed so as to be superimposed thereon within a certain angular range, and when the reconstruction region is appropriately set, the display of the dynamic image is continued up to the last frame. Thereafter, the control unit 11 stops the display of the dynamic image. Then, the central position of the reconstruction region is transmitted from the reconstruction region identification unit 19 to the reconstruction unit 20. In accordance therewith, the reconstruction unit 20 reconstructs a three-dimensional image of $256^3$ or $512^3$ centering on the center of the reconstruction region.

The operator confirms the dynamic image and the reconstruction region displayed so as to be superimposed thereon within a certain angular range (step S38). When the reconstruction region is not appropriately set, the operator presses the determination button again. In accordance therewith, the control unit 11 stops the display of the dynamic image again (step S39). Thereafter, in the same way as that in step S28, the control unit 11 displays the pointer 31 at the center of the DSA image displayed on the image display unit 23 (step S40). The operator presses the determination button at a point in time when the pointer 31 has been moved to a position of a target structure (step S41). In this manner, a position of a second point necessary for identification of a reconstruction region is modified. Due to this modification, the reconstruction region identification unit 19 recalculates a position of the target structure in three dimensions, and modifies the central position of the reconstruction region. In the case of automatically carrying out tracking, there are cases in which precise tracking is impossible due to the cause that the target structure is superimposed on another blood vessel, or the like. The processes in steps S39 to S41 are evasive processes in such cases.

As described above, in the locating process in the third embodiment, because a central position of a reconstruction region is identified by merely specifying one point in an image on which it is easy to observe a target structure by an operator, the operations are further simplified compared with those in the first and second embodiments.

Further, by displaying the reconstruction region determined as a result of tracking so as to be superimposed on a dynamic image display, it is possible for the operator to confirm a region to be actually reconstructed. Note that it goes without saying that the confirmation and the display of the reconstruction region as shown in the third embodiment may be carried out after the processes in FIGS. 4 and 6.

Figure 10:
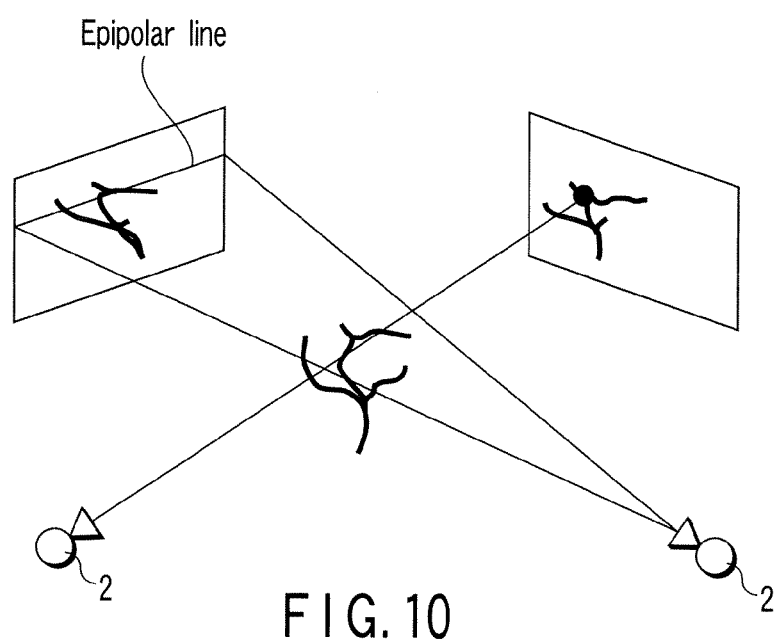
FIG. 10 is a diagram showing a modified example of the third embodiment.
Figure 11:
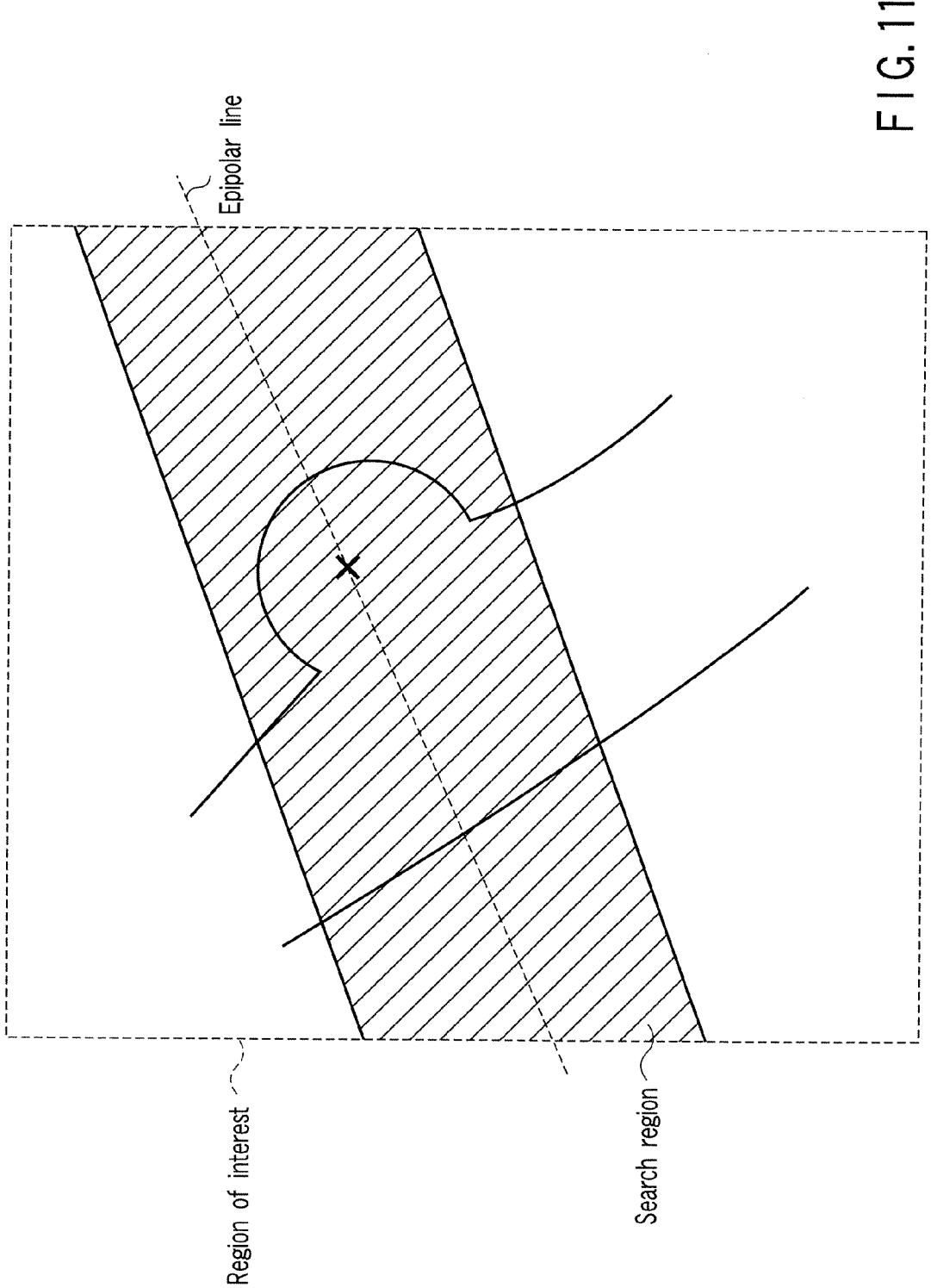
FIG. 11 is a diagram showing an extracted region of only the peripheral part of an epipolar line.

Further, in the third embodiment, tracking of the corresponding region has been carried out by only the correlated computation. However, this may be structured such that a straight line connecting the point specified in step S34 with a focal point of the X-ray tube 2 at that time is identified, and an epipolar line as shown in FIG. 10 is determined by projecting the straight line by the X-ray tube 2 at each angle, and as shown in FIG. 11, a region of interest is set around the epipolar line to carry out the correlated computation within only the region of interest. In accordance therewith, it can be expected to prevent misdirected tracking while shortening a searching time of a second point.

Moreover, tracking of a target region is not carried out within a certain angular range, and for example, a region most similar to a region of interest initially set is searched on the epipolar line at every 10 degrees, and data on a sinogram may be used as reliable data thereamong.

Fourth Embodiment

Next, a fourth embodiment of the present invention will be described. The fourth embodiment is a third modified example of the locating process in step S1 and the reconstruction region identification processing in step S2 in FIG. 3. Note that, because the structure of the apparatus and the processes on and after step S3 in FIG. 3 are the same as those in the first embodiment, descriptions thereof will be omitted.

Figure 12:
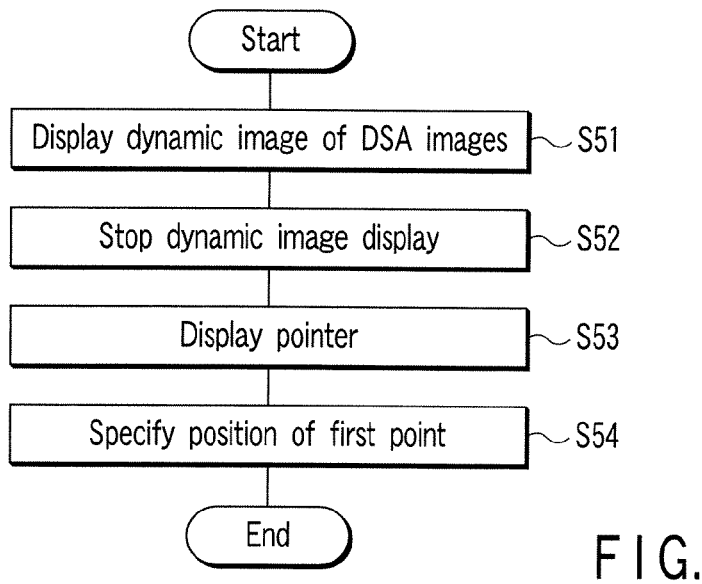
FIG. 12 is a flowchart showing details of locating process in a fourth embodiment.

FIG. 12 is a flowchart showing details of locating process in the fourth embodiment. First, the control unit 11 sequentially displays the DSA images from respective projection views one by one on the image display unit 23 immediately after the DSA images from respective projection views have been obtained by the subtraction processor 14 (step S51). An operator observes the dynamic image displayed on the image display unit 23, and at a point in time when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S52). Here, in the fourth embodiment, in the same way as that in the second embodiment, at a point in time when the display of the dynamic image is stopped, only a DSA image displayed at that time is displayed as a still image, and moreover, the pointer 30 as shown in FIG. 5A is displayed at the central position of the DSA image (step S53).

When a mouse operation is carried out in this state by the operator, the pointer 30 moves in accordance with the operation. The operator presses the determination button at a point in time when the pointer 30 has been moved to a position of the target structure (step S54). In accordance therewith, a position of a point necessary for identification of a reconstruction region is specified.

The reconstruction region identification unit 19 calculates an equation of a straight line connecting the specified point with a position of the X-ray tube 2 at that time, and derives an equation of a plane crossing perpendicularly the straight line on a plane passing through a substantially rotation center of the X-ray imaging system. Thereafter, the reconstruction region identification unit 19 derives the coordinates of an intersection between the plane and the straight line, and defines the intersection as a central position of the reconstruction region. The reconstruction region is to be 512×512×512 in the conventional art, and is defined as a region of 512×256×256 centering on the central coordinate. Here, 512 serving as the major axis is defined so as to be coincident with an axis parallel to the equation of the straight line.

By limiting a reconstruction region by the locating process in the fourth embodiment as described above, it is possible to shorten a reconstruction time to about ¼ of the normal reconstruction time.

Fifth Embodiment

Next, a fifth embodiment of the present invention will be described. The fifth embodiment is a fourth modified example of the locating process in step S1 and the reconstruction region identification processing in step S2 in FIG. 3. Note that, because the structure of the apparatus and the processes on and after step S3 in FIG. 3 are the same as those in the first embodiment, descriptions thereof will be omitted.

Figure 13:
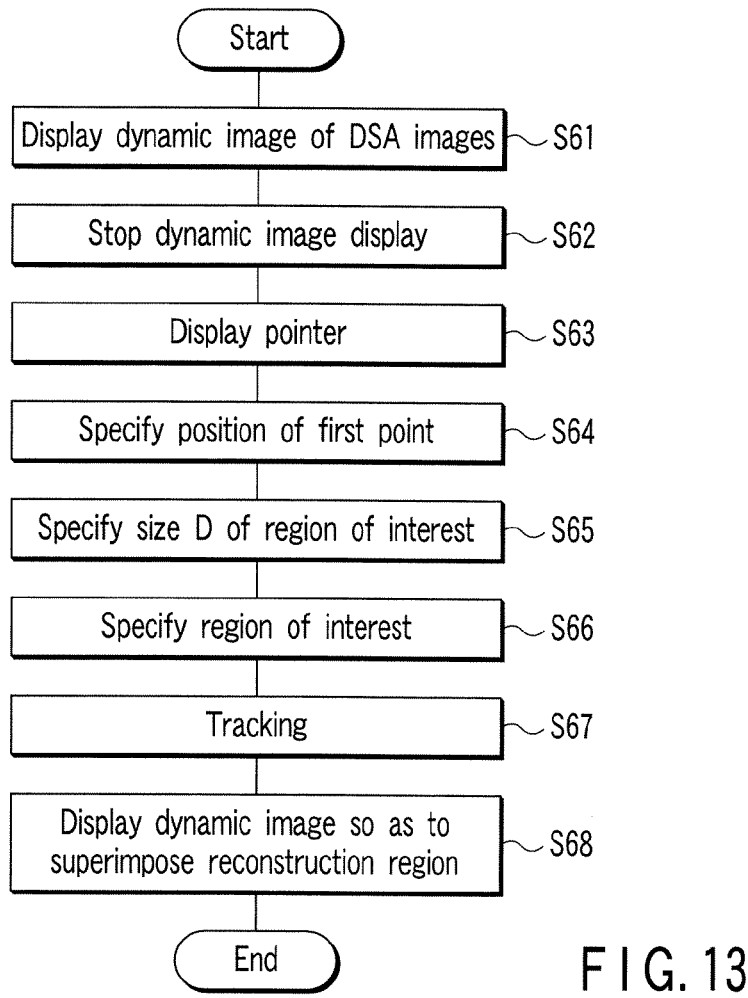
FIG. 13 is a flowchart showing details of locating process in a fifth embodiment.

FIG. 13 is a flowchart showing details of locating process in the fifth embodiment. First, the control unit 11 sequentially displays the DSA images from respective projection views one by one on the image display unit 23 immediately after the DSA images from respective projection views have been obtained by the subtraction processor 14 (step S61). An operator observes the dynamic image displayed on the image display unit 23, and at a point in time when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S62). Then, the pointer 30 as shown, for example, in FIG. 5A is displayed at the central position of the DSA image displayed at that time of stopping the dynamic image (step S63). When a mouse operation is carried out in this state by the operator, the pointer 30 moves in accordance with the operation. The operator presses the determination button at a point in time when the pointer 30 has been moved to a position of the target structure (step S64). Here, in the fifth embodiment, after a position of one point necessary for identification of a reconstruction region is specified, the operator specifies a size D of a region of interest necessary at the time of searching a second point necessary for identification of a reconstruction region by tracking (step S65). In accordance therewith, the control unit 11 sets a region of Dcm×Dcm specified by the operator, centering on a point ($x_0$, $y_0$) in the image specified by the operator, as a region of interest (step S66). Thereafter, the control unit 11 carries out the tracking shown in FIG. 8 (step S67). After the tracking is completed, the reconstruction region identification unit 19 calculates a position of the target structure in three dimensions, and identifies a central position of the reconstruction region. After the central position of the reconstruction region has been identified, the control unit 11 restarts a display of the dynamic image, and further displays the reconstruction region 40 so as to be superimposed on the dynamic image as shown in FIG. 9 (step S68).

In accordance with the locating process in the fifth embodiment as described above, it is possible for the operator to freely set a size of a region of interest at the time of tracking. In accordance therewith, it is possible to shorten a time relating to tracking. Note that, in the example of FIG. 13, when a size of the region of interest is set, one point at which there is a target structure such as an aneurysm and a stenosis is specified in one DSA image, and thereafter, a size of the region of interest is specified. However, this may be structured such that it is possible to specify a region of interest more directly by specifying two or more points in one DSA image. In this case, a shape of the region of interest is not limited to a square region.

Here, in the fifth embodiment as well, the processes of modifying a position of the second point in steps S38 to S41 in the third embodiment may be carried out.

Sixth Embodiment

Next, a sixth embodiment of the present invention will be described. The sixth embodiment is a fifth modified example of the locating process in step S1 and the reconstruction region identification processing in step S2 in FIG. 3. Note that, because the structure of the apparatus and the processes on and after step S3 in FIG. 3 are the same as those in the first embodiment, descriptions thereof will be omitted.

FIG. 14 is a flowchart showing details of locating process in the sixth embodiment. First, the control unit 11 sequentially displays the DSA images from respective projection views one by one on the image display unit 23 immediately after the DSA images from respective projection views have been obtained by the subtraction processor 14 (step S71). An operator observes the dynamic image displayed on the image display unit 23, and at a point in time when an angle from which it is easy to observe a target structure such as an aneurysm and a stenosis is found, the operator presses a determination button (for example, a left-click button) of the mouse serving as the locating unit 18. In accordance with this operation, the control unit 11 stops the display of the dynamic image (step S72). Then, the pointer 30 as shown, for example, in FIG. 5A is displayed at the central position of the DSA image displayed at that time of stopping the dynamic image (step S73). When a mouse operation is carried out in this state by the operator, the pointer 30 moves in accordance with the operation. The operator presses the determination button at a point in time when the pointer 30 has been moved to a position of the target structure (step S74). Here, in the sixth embodiment, after a position of one point necessary for identification of a reconstruction region is specified, the operator specifies a size N of a reconstruction region to be finally obtained (step S75). Thereafter, the control unit 11 sets a region having a size of Dcm×Dcm, centering on a point ($x_0$, $y_0$) in the image specified by the operator, as a region of interest (step S76). Thereafter, the control unit 11 carries out the tracking shown in FIG. 8 (step S77). After the tracking is completed, the reconstruction region identification unit 19 calculates a position of the target structure in three dimensions, and identifies a central position of the reconstruction region.

After the central position of the reconstruction region is identified, the control unit 11 restarts a display of the dynamic image, and further displays the reconstruction region 40 so as to be superimposed on the dynamic image as shown in FIG. 9 (step S78). Here, in the sixth embodiment, the reconstruction region is displayed by drawing a square in a size of the reconstruction region specified by the operator (for example, a square in a size of N×N) centering on a projected point of the central position identified by the reconstruction region identification unit 19.

The operator confirms the dynamic image and the reconstruction region displayed so as to be superimposed thereon within a certain angular range, and when the reconstruction region is appropriately set, the display of the dynamic image is continued up to the last frame. Thereafter, the control unit 11 stops the display of the dynamic image. Then, the central position of the reconstruction region is transmitted from the reconstruction region identification unit 19 to the reconstruction unit 20. In accordance therewith, the reconstruction unit 20 reconstructs a three-dimensional image of $N^3$ centering on the center of the reconstruction region. Here, in the sixth embodiment as well, the processes of modifying a position of the second point in steps S38 to S41 in the third embodiment may be carried out.

In accordance with the locating process in the sixth embodiment as described above, it is possible for the operator to freely set a size of a reconstruction region. Note that a shape of a reconstruction region is not limited to a cube, and may be a spherical shape or the like with a radius specified by the operator, centering on the central position specified by the reconstruction region identification unit 19. Further, in the example of FIG. 14, one point at which there is a target structure such as an aneurysm and a stenosis is specified in one DSA image, and a corresponding point in a DSA image from another view is searched by tracking. However, as shown in FIG. 15, this may be structured such that two points 50 and 51 are specified in one DSA image, and two points 50*a* and 51*a* corresponding to those are searched by tracking, or specified by the operator, thereby making it possible to set a reconstruction region in an arbitrary size.

Further, in the respective embodiments described above, the X-ray diagnostic apparatus has been shown as the three-dimensional image processing apparatus. However, the invention is not limited thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An X-ray diagnostic apparatus which obtains a plurality of images from different projection views of a patient by repeating imaging while rotating an X-ray tube around the patient, the apparatus comprising:
    a display on which images are sequentially displayed;
    control circuitry configured to stop sequential display of the images, and thereafter to control the display to display, as static images, to determine a first image and at least one second image among the plurality of images obtained from different projection views, and to determine a first point in the first image and a second point in the at least one second image;
    reconstruction region identification circuitry which calculates a three-dimensional point based on a first straight line and a second straight line, the first straight line connecting the first point and a point at which the X-ray tube is positioned when the first image is obtained, the second straight line connecting the second point and a point at which the X-ray tube is positioned when the second image is obtained, determines a reconstruction region, the reconstruction region being included in a region defined by a preset distance from the three-dimensional point and being less than a voxel matrix size of a region which can be reconstructed, and identifies an area corresponding to the reconstruction region in each of the plurality of images; and
    reconstruction circuitry which reconstructs a three-dimensional image using the area identified in each of the plurality of images by carrying out a backprojection operation.

2. The X-ray diagnostic apparatus according to claim 1, wherein the at least one second image is an image at an angle of 30° or less from the first image.

3. The X-ray diagnostic apparatus according to claim 1, wherein the control circuitry displays the area identified by the reconstruction region identification circuitry so as to be superimposed on the plurality of images on the display.

4. The X-ray diagnostic apparatus according to claim 1, wherein the control circuitry extracts a region centering on the first point as a region of interest, searches a further point corresponding to the first point in the image in a different projection view on the basis of an image of the region of interest, and defines the further point as the second point in the image in a different projection view.

5. The X-ray diagnostic apparatus according to claim 4, wherein the control circuitry searches the further point by a correlated computation.

6. The three-dimensional image processing apparatus according to claim 4, wherein the reconstruction region identification circuitry carries out the correlated computation within the region of interest and within a region limited by an epipolar line.

7. The X-ray diagnostic apparatus according to claim 4, wherein a range of the correlated computation is determined on the basis of an image around the first point.

8. The X-ray diagnostic apparatus according to claim 4, wherein the control circuitry specifies a size of the region of interest, and extracts a region, centering on the first point and having the size, as the region of interest.

9. The three-dimensional image processing apparatus according to claim 4, wherein the reconstruction region identification circuitry has a region of interest specification circuitry to specify a plurality of points for specifying the region of interest, and extracts a region having a size specified by the region of interest specification circuitry, as the region of interest.

10. The three-dimensional image processing apparatus according to claim 1, wherein, after a reconstruction region is identified by the reconstruction region identification circuitry the control circuitry restarts a display of the dynamic image, and displays the identified reconstruction region on the display so as to be superimposed on respective frames of the dynamic image which has been restarted.

11. The X-ray diagnostic apparatus according to claim 3, wherein the reconstruction region identification circuitry determines a final reconstruction region at a point in time when the superimposed display is completed.

12. The three-dimensional image processing apparatus according to claim 10, wherein the reconstruction region identification circuitry determines a final reconstruction region at a point in time when the superimposed display is completed.

13. The X-ray diagnostic apparatus according to claim 1, wherein the reconstruction region identification circuitry specifies a size of the reconstruction region, determines a region, centering on the three-dimensional point and having the size; as the reconstruction region.

14. The three-dimensional image processing apparatus according to claim 1, further comprising a reconstruction region specification circuitry to specify a plurality of points for specifying the reconstruction region, wherein the reconstruction region identification circuitry identifies a region having a size specified by the reconstruction region specification circuitry, as the reconstruction region.

15. A reconstruction region specification method for reconstructing a three-dimensional image from a plurality of images from different projection views of a patient by repeating imaging while rotating an X-ray tube around the patient, the method comprising:
sequentially displaying the plurality of images;
determining a first image and at least one second image among the plurality of images obtained from different projection views and stopping sequential display of the images to display, as static images, the first image and the at least one second image;
determining a first point in the first image and a second point in the at least one second image;
calculating a three-dimensional point based on a first straight line and a second straight line, the first straight line connecting the first point and a point at which the X-ray tube is positioned when the first image is obtained, the second straight line connecting the second point and a point at which the X-ray tube is positioned when the second image is obtained;
determining a reconstruction region, the reconstruction region being included in a region defined by a preset distance from the three-dimensional point, said reconstruction region being less than a voxel matrix size of a region which can be reconstructed;
identifying in each of the plurality of images an area corresponding to the reconstruction region; and
reconstructing a three-dimensional image using the area identified in each of the plurality of images by carrying out a backprojection operation.

* * * * *